(12) United States Patent
Langenbacher et al.

(10) Patent No.: US 11,675,182 B2
(45) Date of Patent: Jun. 13, 2023

(54) LIQUID LENSES WITH SHOCK PROTECTION

(71) Applicant: CORNING INCORPORATED, Corning, NY (US)

(72) Inventors: Paul Ewing Langenbacher, Ithaca, NY (US); Minjie Ma, Goleta, CA (US); Christopher R C Olson, Goleta, CA (US); Upendra Milind Phatak, Goleta, CA (US)

(73) Assignee: Corning Incorporated, Corning, NY (US)

( * ) Notice: Subject to any disclaimer, the term of this patent is extended or adjusted under 35 U.S.C. 154(b) by 240 days.

(21) Appl. No.: 17/091,859

(22) Filed: Nov. 6, 2020

(65) Prior Publication Data
US 2021/0157124 A1    May 27, 2021

Related U.S. Application Data

(60) Provisional application No. 62/939,142, filed on Nov. 22, 2019.

(51) Int. Cl.
*G02B 26/00* (2006.01)
*G02B 3/14* (2006.01)

(52) U.S. Cl.
CPC ............. *G02B 26/005* (2013.01); *G02B 3/14* (2013.01)

(58) Field of Classification Search
CPC ...... G02B 3/14; G02B 26/005; G02B 26/004; G02B 3/12; G02B 27/646; G02B 13/0075; G02B 26/02; G02B 3/0006; G02B 26/0825; G02B 27/64; G02B 7/28; G02B 13/14; G02B 23/24; G02B 3/0081; G02B 7/021; G02B 1/06; G02B 27/0068; G02B 3/00;
(Continued)

(56) References Cited

U.S. PATENT DOCUMENTS 5,870,139 A * 2/1999 Cooper .................. H04N 7/181
                                                    348/E7.086
7,180,425 B2    2/2007 Yuasa
(Continued)

FOREIGN PATENT DOCUMENTS

CN        106580255 A       4/2017
WO     2019/226647 A1      11/2019

OTHER PUBLICATIONS

Goujon et al; "How Does the Surface Tension Depend On the Surface Area With Coarse-Grained Models?"; J. Chem. Theory Comput., 2018, 14 pp. 2644-2651.

*Primary Examiner* — Brandi N Thomas
(74) *Attorney, Agent, or Firm* — Tamika A. Crawl-Bey

(57) ABSTRACT

A method of operating a liquid lens can include positioning a variable interface between first and second liquids in a brace position in response to a brace trigger event. The variable interface can be adjustable between (a) a rest position in which a perimeter of the variable interface is spaced from a first window of the liquid lens by a rest distance and (b) the brace position in which the perimeter of the variable interface is spaced from the first window by a brace distance. The brace distance can be greater than the rest distance. In the rest position, the variable interface can have a rest surface area. In the brace position, the variable interface can have a brace surface area. The brace surface area can be less than the rest surface area.

18 Claims, 11 Drawing Sheets

(58) Field of Classification Search
CPC .......... G02B 7/02; G02B 7/028; G02B 1/041; G02B 1/043; G02B 13/009; G02B 2207/115; G02B 26/00; G02B 7/09; G02B 13/0045; G02B 15/1425; G02B 2027/0118; G02B 2027/014; G02B 23/2423; G02B 26/06; G02B 26/0858; G02B 26/0866; G02B 27/0075; G02B 27/0101; G02B 27/017; G02B 3/0043; G02B 3/005; G02B 3/0056; G02B 3/06; G02B 30/24; G02B 30/27; G02B 30/28; G02B 30/52; G02B 5/201; G02B 7/008; G02B 7/04; G02C 7/04; G02C 7/085; G02C 7/083; G02C 7/08; G02C 11/10; G02C 13/008; G02C 7/02; G02C 7/049; G02C 7/101; G02C 2202/16; G02C 2202/18; G02C 2202/20; G02C 5/045; G02C 5/22; G02C 7/022; G02C 7/024; G02C 7/041; G02C 7/10; G02C 7/104; G02C 7/12; G02F 1/294; G02F 1/29; G02F 1/133; G02F 1/134309; G02F 1/1343; G02F 1/1347; G02F 2203/06; G02F 1/133526; G02F 1/13471; G02F 1/13; G02F 1/1313; G02F 1/13306; G02F 1/13312; G02F 1/133351; G02F 1/1335; G02F 1/133553; G02F 1/133788; G02F 1/13394; G02F 1/134363; G02F 1/134381; G02F 1/1345; G02F 1/13775; G02F 1/139; G02F 1/291; G02F 2201/122; G02F 2201/52; G02F 2203/62
See application file for complete search history.

(56) References Cited

U.S. PATENT DOCUMENTS

| | | | |
|---|---|---|---|
| 7,369,345 | B1 | 5/2008 | Li et al. |
| 7,451,057 | B2 | 11/2008 | Kim et al. |
| 7,556,443 | B2 | 7/2009 | Kleverman |
| 7,751,142 | B2 | 7/2010 | Karakas |
| 8,044,818 | B2 | 10/2011 | Tysowski et al. |
| 8,238,033 | B2 * | 8/2012 | Takai .................. G02B 3/14 |
| | | | 359/665 |
| 8,400,558 | B2 | 3/2013 | Berge et al. |
| 8,494,352 | B2 | 7/2013 | Yasuda et al. |
| 9,462,264 | B2 | 10/2016 | Mateti et al. |
| 9,952,358 | B2 | 4/2018 | Karam et al. |
| 10,097,742 | B1 | 10/2018 | Kim et al. |
| 10,419,651 | B2 | 9/2019 | Kim et al. |
| 2005/0279165 | A1 | 12/2005 | Yuasa |
| 2007/0014547 | A1 | 1/2007 | Kasuya |
| 2011/0149407 | A1 | 6/2011 | Dharmatilleke et al. |
| 2014/0017625 | A1 | 1/2014 | Liu et al. |
| 2015/0097690 | A1 | 4/2015 | Ady et al. |
| 2016/0187642 | A1 | 6/2016 | Karam et al. |
| 2016/0299264 | A1 | 10/2016 | Karam et al. |
| 2017/0331993 | A1 | 11/2017 | Xu et al. |
| 2019/0227405 | A1 | 7/2019 | Cheng et al. |
| 2019/0361322 | A1 | 11/2019 | Moon et al. |

* cited by examiner

LIQUID LENSES WITH SHOCK PROTECTION

CROSS REFERENCE TO RELATED APPLICATIONS

This application claims the benefit of priority under 35 U.S.C. § 119 of U.S. Provisional Application No. 62/939,142, filed Nov. 22, 2019, the content of which is incorporated herein by reference in its entirety.

BACKGROUND

1. Field

This disclosure relates to liquid lenses, and more particularly, to liquid lenses and methods for operating liquid lenses to reduce the likelihood of damage to the liquid lenses resulting from shock.

2. Technical Background

Liquid lenses generally include two immiscible liquids disposed within a chamber. Varying the electric field to which the liquids are subjected can vary the wettability of one of the liquids with respect to the chamber wall, thereby varying the shape of the meniscus formed between the two liquids.

SUMMARY

Disclosed herein are liquid lenses and methods of operating liquid lenses.

Disclosed herein is a method of operating a liquid lens. The method can comprise positioning a variable interface between a first liquid and a second liquid in a brace position in response to a brace trigger event. The variable interface can be adjustable between (a) a rest position in which a perimeter of the variable interface is spaced from a first window of the liquid lens by a rest distance and (b) the brace position in which the perimeter of the variable interface is spaced from the first window of the liquid lens by a brace distance. For example, in the rest position, the variable interface can have a concave lens configuration. Additionally, or alternatively, in the brace position, the variable interface can have a substantially flat or planar configuration. The brace distance can be greater than the rest distance. In the rest position, the variable interface can comprise a rest surface area. In the brace position, the variable interface can comprise a brace surface area. The brace surface area can be less than the rest surface area.

Disclosed herein is a liquid lens system comprising a first window, a second window, a cavity disposed between the first window and the second window, a first liquid disposed in the cavity, a second liquid disposed in the cavity, and a variable interface disposed between the first liquid and the second liquid. The variable interface can be adjustable between (a) a rest position in which a perimeter of the variable interface is spaced from the first window of the liquid lens by a rest distance and (b) a brace position in which the perimeter of the variable interface is spaced from the first window of the liquid lens by a brace distance. A controller can be configured to supply a brace voltage signal to the liquid lens in response to a brace trigger event. The brace distance can be greater than the rest distance. In the rest position, the variable interface can comprise a rest surface area. In the brace position, the variable interface can comprise a brace surface area. The brace surface area can be less than the rest surface area.

It is to be understood that both the foregoing general description and the following detailed description are merely exemplary, and are intended to provide an overview or framework to understanding the nature and character of the claimed subject matter. The accompanying drawings are included to provide a further understanding and are incorporated in and constitute a part of this specification. The drawings illustrate one or more embodiment(s), and together with the description, serve to explain principles and operation of the various embodiments.

DETAILED DESCRIPTION

Figure 1:
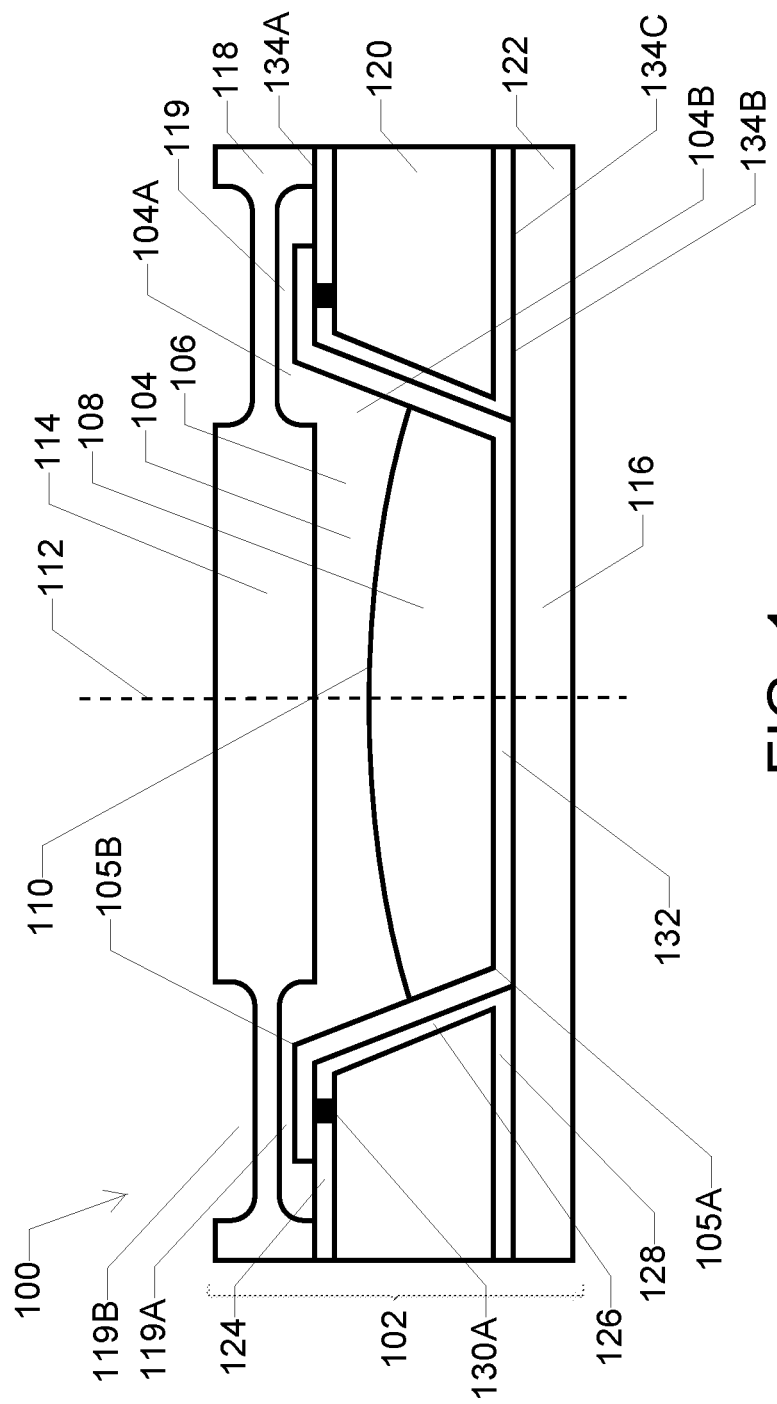
FIG. 1 is a schematic cross-sectional view of some embodiments of a liquid lens.

Reference will now be made in detail to exemplary embodiments which are illustrated in the accompanying drawings. Whenever possible, the same reference numerals will be used throughout the drawings to refer to the same or like parts. The components in the drawings are not necessarily to scale, emphasis instead being placed upon illustrating the principles of the exemplary embodiments.

Numerical values, including endpoints of ranges, can be expressed herein as approximations preceded by the term "about," "approximately," or the like. In such cases, other embodiments include the particular numerical values. Regardless of whether a numerical value is expressed as an approximation, two embodiments are included in this disclosure: one expressed as an approximation, and another not expressed as an approximation. It will be further understood that an endpoint of each range is significant both in relation to another endpoint, and independently of another endpoint.

In various embodiments, a method of operating a liquid lens comprises positioning a variable interface between a first liquid and a second liquid in a brace position in response to a brace trigger event. The variable interface can be adjustable between (a) a rest position in which a perimeter of the variable interface is spaced from a first window of the liquid lens by a rest distance and the variable interface comprises a rest surface area and (b) the brace position in which the perimeter of the variable interface is spaced from the first window of the liquid lens by a brace distance and the variable interface comprises a brace surface area. For example, in the rest position, the variable interface can have a concave lens configuration. Additionally, or alternatively, in the brace position, the variable interface can have a substantially flat or planar configuration. The brace distance can be greater than the rest distance. The brace surface area can be less than the rest surface area.

Moving the variable interface into the brace position (e.g., from the rest position or a driving position in which the variable interface is adjustable to adjust the focal length and/or tilt of the liquid lens) can increase the distance between the variable interface (e.g., the perimeter of the variable interface) and the first window. Such movement of the variable interface can reduce the likelihood of the second liquid contacting the first window in the event the liquid lens is subjected to a shock event (e.g., caused by an impact when a device comprising the liquid lens is dropped). Additionally, or alternatively, moving the variable interface into the brace position can decrease the surface area of the variable interface, which can increase the energy barrier for a droplet of the second liquid to separate from the bulk of the second liquid at the variable interface. Such movement of the variable interface can reduce the likelihood of the second liquid emulsifying into the first liquid (e.g., small droplets of the second liquid separating from the bulk of the second liquid and dispersing into the first liquid) in the event the liquid lens is subjected to a shock event. The brace position can be a relatively safe position for the variable interface (e.g., to protect the second liquid from contacting the first window and/or to protect the liquids from emulsifying) in the event the liquid lens is subjected to a shock event. The devices and systems described herein can position the variable interface in such a relatively safe position during times in which a shock even may be more likely (e.g., when the device is dropped) and/or during times in which the variable interface is not being operated to adjust the focal length and/or tilt of the liquid lens (e.g., when a camera of the device is deactivated). For example, the brace position can be the default position for the variable interface (e.g., as opposed to the rest position) to help protect the liquid lens from emulsification.

FIG. 1 is a schematic cross-sectional view of some embodiments of a liquid lens 100. In some embodiments, liquid lens 100 comprises a lens body 102 and a cavity 104 formed or disposed in the lens body. A first liquid 106 and a second liquid 108 are disposed within cavity 104. In some embodiments, first liquid 106 is a polar liquid or a conducting liquid (e.g., an aqueous salt solution). Additionally, or alternatively, second liquid 108 is a non-polar liquid or an insulating liquid (e.g., an oil). In some embodiments, first liquid 106 and second liquid 108 have different refractive indices such that an interface 110 between the first liquid and the second liquid forms a lens. In some embodiments, first liquid 106 and second liquid 108 have substantially the same density, which can help to avoid changes in the shape of interface 110 as a result of changing the physical orientation of liquid lens 100 (e.g., as a result of gravitational forces).

In some embodiments, first liquid 106 and second liquid 108 are in direct contact with each other at interface 110. For example, first liquid 106 and second liquid 108 are substantially immiscible with each other such that the contact surface between the first liquid and the second liquid defines interface 110. In some embodiments, first liquid 106 and second liquid 108 are separated from each other at interface 110. For example, first liquid 106 and second liquid 108 are separated from each other by a membrane (e.g., a polymeric membrane) that defines interface 110.

In some embodiments, cavity 104 comprises a first portion, or headspace, 104A and a second portion, or base portion, 104B. For example, second portion 104B of cavity 104 is defined by a bore in an intermediate layer of liquid lens 100 as described herein. Additionally, or alternatively, first portion 104A of cavity 104 is defined by a recess in a first outer layer of liquid lens 100 and/or disposed outside of the bore in the intermediate layer as described herein. In some embodiments, at least a portion of first liquid 106 is disposed in first portion 104A of cavity 104. Additionally, or alternatively, second liquid 108 is disposed within second portion 104B of cavity 104. For example, substantially all or a portion of second liquid 108 is disposed within second portion 104B of cavity 104. In some embodiments, the perimeter of interface 110 (e.g., the edge of the interface in contact with the sidewall of the cavity and/or an insulating layer as described herein) is disposed within second portion 104B of cavity 104.

Interface 110 can be adjusted via electrowetting. For example, a voltage can be applied between first liquid 106 and a surface of cavity 104 (e.g., an electrode positioned near the surface of the cavity and insulated from the first liquid as described herein) to increase or decrease the wettability of the surface of the cavity with respect to the first liquid and change the shape of interface 110 as described herein. In some embodiments, a refractive index of first liquid 106 is different than a refractive index of second liquid 108 such that light is refracted at interface 110 as described herein. For example, first liquid 106 has a lower refractive index or a higher refractive index than second liquid 108. Thus, interface 110 can function as a variable lens also as described herein.

In some embodiments, lens body 102 of liquid lens 100 comprises a first window 114 and a second window 116. In some of such embodiments, at least a portion of cavity 104 is disposed between first window 114 and second window 116. In some embodiments, lens body 102 comprises a plurality of layers that cooperatively form the lens body. For example, in the embodiments shown in FIG. 1, lens body 102 comprises a first outer layer 118 (e.g., a top plate), an intermediate layer 120 (e.g., a cone plate), and a second outer layer 122 (e.g., a bottom plate). In some of such embodiments, intermediate layer 120 comprises a bore formed therethrough. First outer layer 118 can be bonded to one side (e.g., the object side or the top side) of intermediate layer 120. For example, first outer layer 118 is bonded to intermediate layer 120 at a bond 134A. Bond 134A can be an adhesive bond, a laser bond (e.g., a room temperature laser bond or a laser weld), or another suitable bond capable of maintaining first liquid 106 and second liquid 108 within cavity 104. Additionally, or alternatively, second outer layer 122 can be bonded to the other side (e.g., the image side or the bottom side) of intermediate layer 120 (e.g., opposite first outer layer 118). For example, second outer layer 122 is bonded to intermediate layer 120 at a bond 134B and/or a bond 134C, each of which can be configured as described herein with respect to bond 134A. In some embodiments, intermediate layer 120 is disposed between first outer layer 118 and second outer layer 122, the bore in the intermediate layer is covered on opposing sides by the first outer layer and the second outer layer, and at least a portion of cavity 104 is defined within the bore. Thus, a portion of first outer layer 118 covering cavity 104 serves as first window 114, and a portion of second outer layer 122 covering the cavity serves as second window 116.

In some embodiments, cavity 104 comprises first portion 104A and second portion 104B. For example, in the embodiments shown in FIG. 1, second portion 104B of cavity 104 is defined by the bore in intermediate layer 120, and first portion 104A of the cavity is disposed between the second portion of the cavity and first outer layer 118. In some embodiments, first outer layer 118 comprises a recess 119 as shown in FIG. 1, and first portion 104A of cavity 104 is disposed within the recess in the first outer layer. In some embodiments, first portion 104A of cavity 104 is disposed outside of the bore in intermediate layer 120. In some embodiments, recess 119 comprises an annular internal recess 119A disposed on an inner surface (e.g., inside cavity 104) of first outer layer 118 and circumscribing or substantially circumscribing first window 114. In some embodiments, recess 119 comprises an annular external recess 119B disposed on an outer surface (e.g., outside cavity 104) of first outer layer 118 and circumscribing or substantially circumscribing first window 114. For example, in some embodiments, recess 119 comprises both internal recess 119A and external recess 119B as shown in FIG. 1. In some of such embodiments, a thinned portion of first outer layer 118 can serve as a flexure. For example, first window 114 comprises a thicker portion of first outer layer 118 circumscribed by the thinner flexure defined between internal recess 119A and external recess 119B. The flexure can enable first window 114 to move axially (e.g., up and down along structural axis 112). Such movement can enable first outer layer 118 to compensate for changes in the volume of first liquid 108 and/or second liquid 108 (e.g., resulting from temperature changes and corresponding expansion and/or contraction of the liquids).

In some embodiments, cavity 104, or a portion thereof (e.g., second portion 104B of the cavity), is tapered as shown in FIG. 1 such that a cross-sectional area of the cavity decreases along a structural axis 112 of liquid lens 100 in a direction from first window 114 toward second window 116 (e.g., from the object side to the image side). For example, second portion 104B of cavity 104 comprises a conical or frustoconical shape with a narrow end 105A and a wide end 105B. The terms "narrow" and "wide" are relative terms, meaning the narrow end is narrower, or has a smaller width or diameter, than the wide end. Such a tapered cavity can help to maintain alignment of interface 110 between first liquid 106 and second liquid 108 along structural axis 112. In other embodiments, the cavity is tapered such that the cross-sectional area of the cavity increases along the structural axis in the direction from first window 114 toward second window 116 or non-tapered such that the cross-sectional area of the cavity remains substantially constant along the structural axis. In some embodiments, cavity 104 is rotationally symmetrical about structural axis 112.

In some embodiments, image light enters liquid lens 100 through first window 114, is refracted at interface 110 between first liquid 106 and second liquid 108, and exits the liquid lens through second window 116. In some embodiments, first outer layer 118 and/or second outer layer 122 comprise a sufficient transparency to enable passage of the image light. For example, first outer layer 118 and/or second outer layer 122 comprise a polymeric, glass, ceramic, or glass-ceramic material. In some embodiments, outer surfaces of first outer layer 118 (e.g., first window 114) and/or second outer layer 122 (e.g., second window 116) are substantially planar. Thus, even though liquid lens 100 can function as a lens (e.g., by refracting image light passing through interface 110), outer surfaces of the liquid lens can be flat as opposed to being curved like the outer surfaces of a fixed lens. Such planar outer surfaces can make integrating liquid lens 100 into an optical assembly (e.g., a lens stack comprising one or more fixed lenses disposed in a housing or lens barrel) less difficult. In other embodiments, outer surfaces of the first outer layer and/or the second outer layer are curved (e.g., concave or convex). Thus, the liquid lens can comprise an integrated fixed lens. In some embodiments, intermediate layer 120 comprises a metallic, polymeric, glass, ceramic, or glass-ceramic material. Because image light can pass through the bore in intermediate layer 120, the intermediate layer may or may not be transparent to image light.

Although lens body 102 of liquid lens 100 is described as comprising first outer layer 118, intermediate layer 120, and second outer layer 122, other embodiments are included in this disclosure. For example, in some other embodiments, one or more of the layers is omitted. For example, the bore in the intermediate layer can be configured as a blind hole that does not extend entirely through the intermediate layer, and the second outer layer can be omitted. Although first portion 104A of cavity 104 is described herein as being disposed within the recess in first outer layer 118, other embodiments are included in this disclosure. For example, in some other embodiments, the recess is omitted, and the first portion of the cavity is disposed within the bore in the intermediate layer. Thus, the first portion of the cavity is an upper portion of the bore, and the second portion of the cavity is a lower portion of the bore. In some other embodiments, the first portion of the cavity is disposed partially within the bore in the intermediate layer and partially outside the bore.

In some embodiments, liquid lens 100 comprises a common electrode 124 in electrical communication with first liquid 106. Additionally, or alternatively, liquid lens 100 comprises a driving electrode 126 disposed on a sidewall of cavity 104 and insulated from first liquid 106 and second liquid 108. Different voltages can be supplied to common electrode 124 and driving electrode 126 (e.g., different potentials can be supplied between the common electrode and the driving electrode) to change the shape of interface 110 as described herein.

In some embodiments, liquid lens 100 comprises a conductive layer 128 at least a portion of which is disposed within cavity 104. For example, conductive layer 128 comprises a conductive coating applied to intermediate layer 120 prior to bonding first outer layer 118 and/or second outer layer 122 to the intermediate layer. Conductive layer 128 can comprise a metallic material, a conductive polymer material, another suitable conductive material, or a combination thereof. Additionally, or alternatively, conductive layer 128 can comprise a single layer or a plurality of layers, some or all of which can be conductive. In some embodiments, conductive layer 128 defines common electrode 124 and/or driving electrode 126. For example, conductive layer 128 can be applied to substantially the entire outer surface of intermediate layer 118 prior to bonding first outer layer 118 and/or second outer layer 122 to the intermediate layer. Following application of conductive layer 128 to intermediate layer 118, the conductive layer can be segmented into various conductive elements (e.g., common electrode 124, driving electrode 126, and/or other electrical devices). Additionally, or alternatively, conductive layer 128 can be patterned during application (e.g., using lithography, masking, or a suitable printing technique). In some embodiments, liquid lens 100 comprises a scribe 130A in conductive layer 128 to isolate (e.g., electrically isolate) common electrode 124 and driving electrode 126 from each other. In some embodiments, scribe 130A comprises a gap in conductive layer 128. For example, scribe 130A is a gap with a width of about 5 μm, about 10 μm, about 15 μm, about 20 μm, about 25 μm, about 30 μm, about 35 μm, about 40 μm, about 45 μm, about 50 μm, or any ranges defined by the listed values.

In some embodiments, liquid lens 100 comprises an insulating layer 132 disposed within cavity 104. For example, insulating layer 132 comprises an insulating coating applied to intermediate layer 120 and second outer layer 122 prior to bonding first outer layer 118 to the intermediate layer. In some embodiments, insulating layer 132 comprises an insulating coating applied to conductive layer 128 and second window 116 after bonding second outer layer 122 to intermediate layer 120 and prior to bonding first outer layer 118 to the intermediate layer. Thus, insulating layer 132 covers at least a portion of conductive layer 128 within cavity 104 (e.g., driving electrode 126) and second window 116. In some embodiments, insulating layer 132 can be sufficiently transparent to enable passage of image light through second window 116 as described herein. Insulating layer 132 can comprise polytetrafluoroethylene (PTFE), parylene, another suitable polymeric or non-polymeric insulating material, or a combination thereof. Additionally, or alternatively, insulating layer 132 comprises a hydrophobic material. Additionally, or alternatively, insulating layer 132 can comprise a single layer or a plurality of layers, some or all of which can be insulating and/or hydrophobic.

In some embodiments, insulating layer 132 covers at least a portion of driving electrode 126 (e.g., the portion of the driving electrode disposed within cavity 104) to insulate first liquid 106 and second liquid 108 from the driving electrode. Additionally, or alternatively, at least a portion of common electrode 124 disposed within cavity 104 is uncovered by insulating layer 132. Thus, common electrode 124 can be in electrical communication with first liquid 106 as described herein. In some embodiments, insulating layer 132 comprises a hydrophobic surface layer of at least a portion of cavity 104 (e.g., second portion 104B of the cavity). Such a hydrophobic surface layer can help to maintain second liquid 108 within second portion 104B of cavity 104 (e.g., by attraction between the non-polar second liquid and the hydrophobic material) and/or enable the perimeter of interface 110 to move along the hydrophobic surface layer (e.g., by electrowetting) to change the shape of the interface as described herein.

Figure 2:
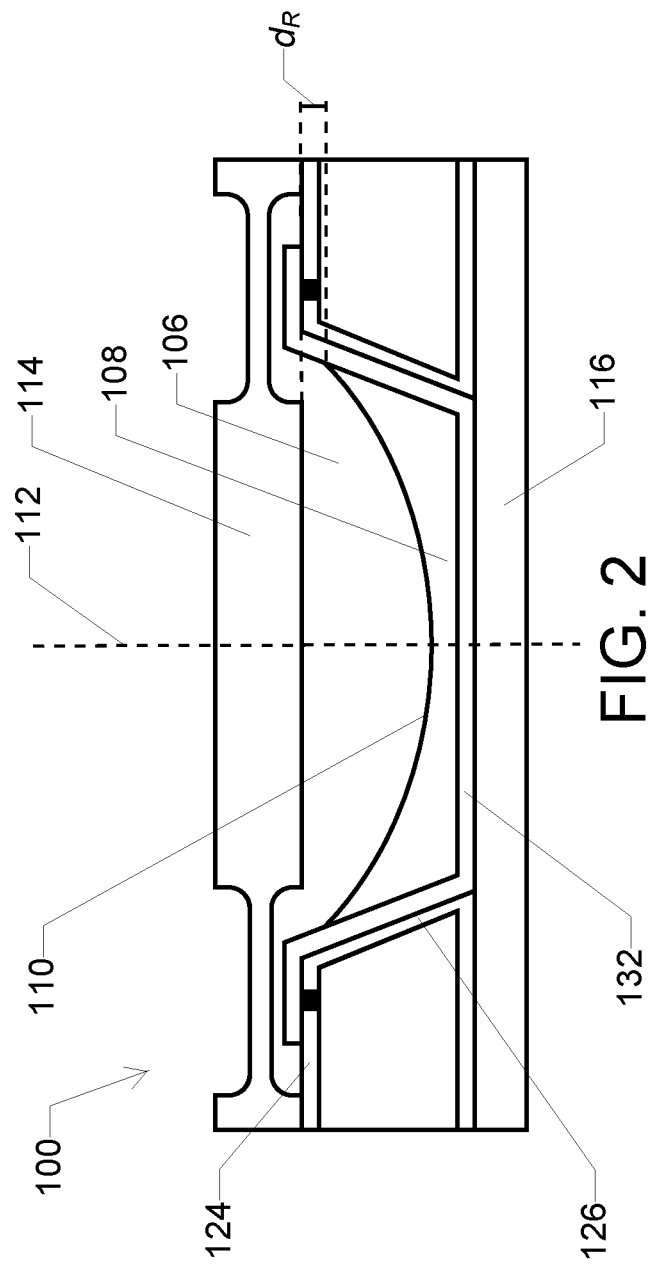
FIG. 2 is a schematic cross-sectional view of some embodiments of the liquid lens shown in FIG. 1 with a varied focal length compared to FIG. 1.

In some embodiments, adjusting interface 110 changes the shape of the interface, which changes the focal length or focus of liquid lens 100. FIG. 2 is a cross-sectional schematic view of liquid lens 100 with an adjusted focal length or focus compared to FIG. 1. For example, the voltage or potential between driving electrode 126 and common electrode 124 can be decreased to decrease the wettability of insulating layer 132 with respect to first liquid 106, thereby driving the first liquid farther up the sidewall (e.g., toward first window 114) and causing interface 110 to change shape. In some embodiments, the refractive index of first liquid 106 is less than the refractive index of second liquid 108 such that decreasing the convex curvature of interface 110 and creating a concave curvature as shown in FIG. 2 decreases the optical power of liquid lens 100 such that the liquid lens becomes a diverging or defocusing lens (e.g., with negative optical power).

Figure 3:
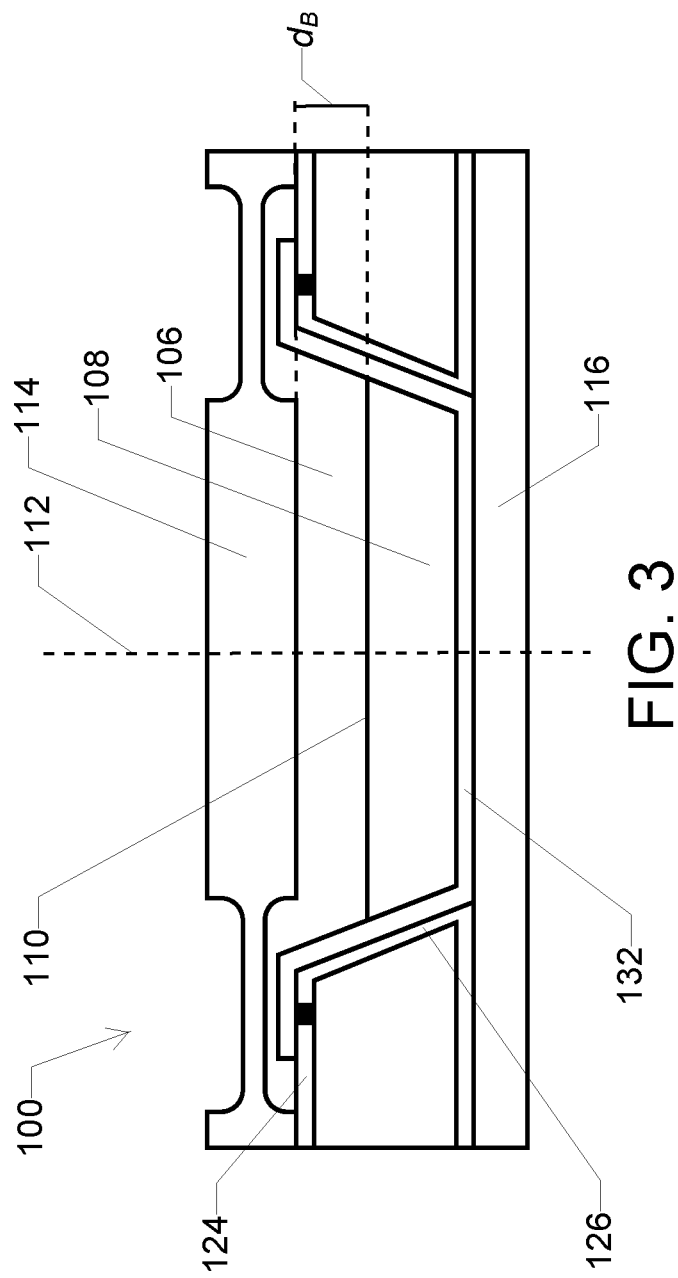
FIG. 3 is a schematic cross-sectional view of some embodiments of the liquid lens shown in FIG. 2 with a varied focal length compared to FIG. 2.

In some embodiments, increasing the voltage can move interface 110 in the opposite direction to increase the optical power of liquid lens 100. FIG. 3 is a cross-sectional schematic view of liquid lens 100 with an adjusted focal length or focus compared to FIG. 2. For example, the voltage or potential between driving electrode 126 and common electrode 124 can be increased to increase the wettability of insulating layer 132 with respect to first liquid 106, thereby driving the first liquid farther down the sidewall (e.g., toward second window 116) and causing interface 110 to change shape. In some embodiments, the refractive index of first liquid 106 is less than the refractive index of second liquid 108 such that decreasing the concave curvature of interface 110 as shown in FIG. 3 increases the optical power of liquid lens 100. For example, interface 110 can be moved from the negative optical power configuration shown in FIG. 2 until the interface becomes flat as shown in FIG. 3 (e.g., no optical power) or convex as shown in FIG. 1 (e.g., positive optical power). In some embodiments, the change in shape of interface 110 can be symmetrical about structural axis 112, thereby changing the focal length of liquid lens 100. Such a change of focal length can enable liquid lens 100 to perform an autofocus function.

Figure 4:
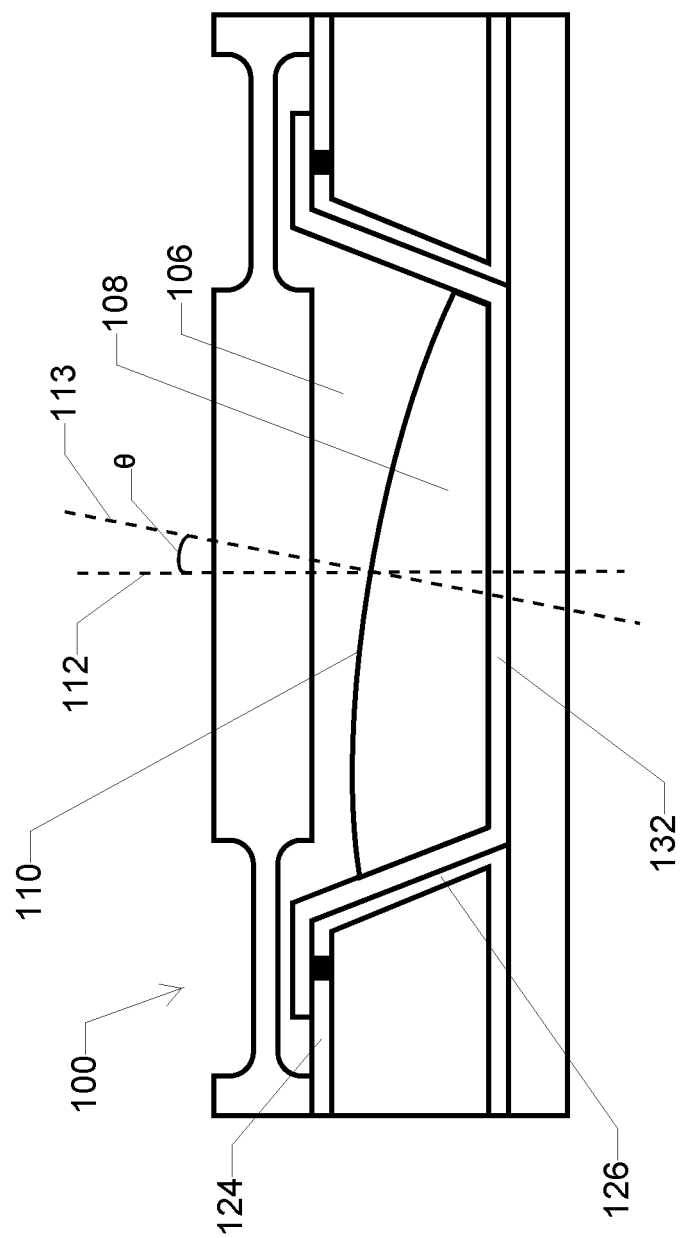
FIG. 4 is a schematic cross-sectional view of some embodiments of the liquid lens shown in FIG. 1 with a varied tilt compared to FIG. 1.

In some embodiments, adjusting interface 110 tilts the interface relative to structural axis 112 of liquid lens 100. FIG. 4 is a cross-sectional schematic view of liquid lens 100 with an adjusted tilt compared to FIG. 1. For example, the voltage between a first portion of driving electrode 126 (e.g., a third driving electrode segment 126C as described herein, positioned on a right side of cavity 104) and common electrode 124 can be increased to increase the wettability of insulating layer 132 with respect to first liquid 106, thereby driving the first liquid farther down the sidewall on one side of the cavity, while the voltage between a second portion of the driving electrode opposite the first portion of the driving electrode (e.g., a first driving electrode segment 126A as described herein, positioned on a left side of the cavity) and the common electrode can be decreased to decrease the wettability of the insulating layer with respect to the first liquid, thereby driving the first liquid farther up the sidewall on an opposite side of the cavity. Following such a change in shape of interface 110, a physical tilt angle θ can be formed between an optical axis 113 of the interface and structural axis 112. For example, optical axis 113 of the tilted interface 110 can be angled relative to structural axis 112 at a physical tilt angle θ. An optical tilt angle of liquid lens 100 can be determined based on physical tilt angle θ and the difference in refractive index Δn between first liquid 106 and second liquid 108. The optical tilt angle can be representative of a degree to which interface 110 can refract light passing through liquid lens 100 (e.g., toward or away from structural axis 112). Such tilting can enable liquid lens 100 to perform an optical image stabilization (OIS) function. Adjusting interface 110 can be achieved without physical movement of liquid lens 100 relative to an image sensor, a fixed lens or lens stack, a housing, or other components of a camera module in which the liquid lens can be incorporated.

Figure 5:
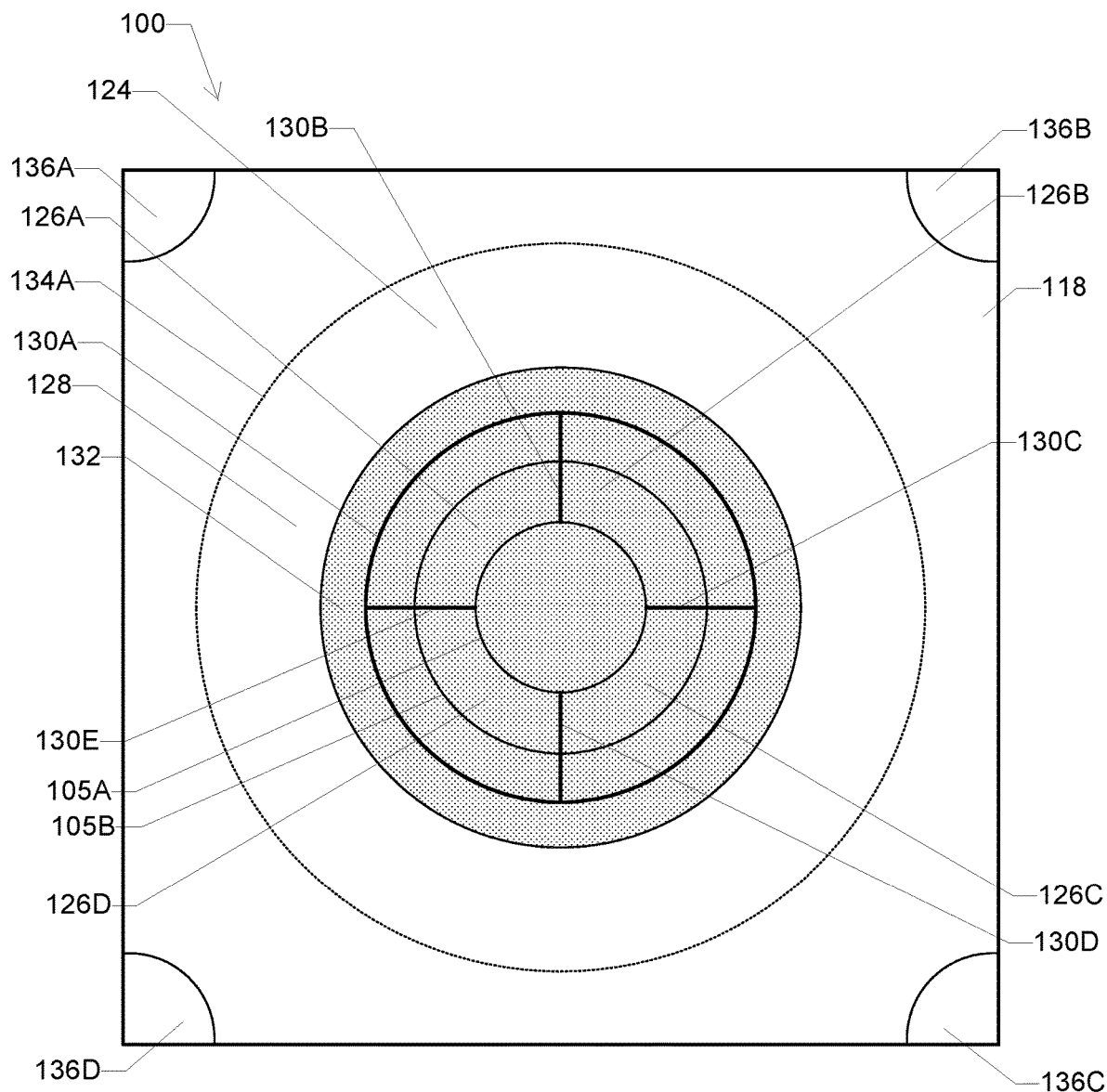
FIG. 5 is a schematic front view of some embodiments of the liquid lens shown in FIG. 1 looking through a first outer layer of the liquid lens.
Figure 6:
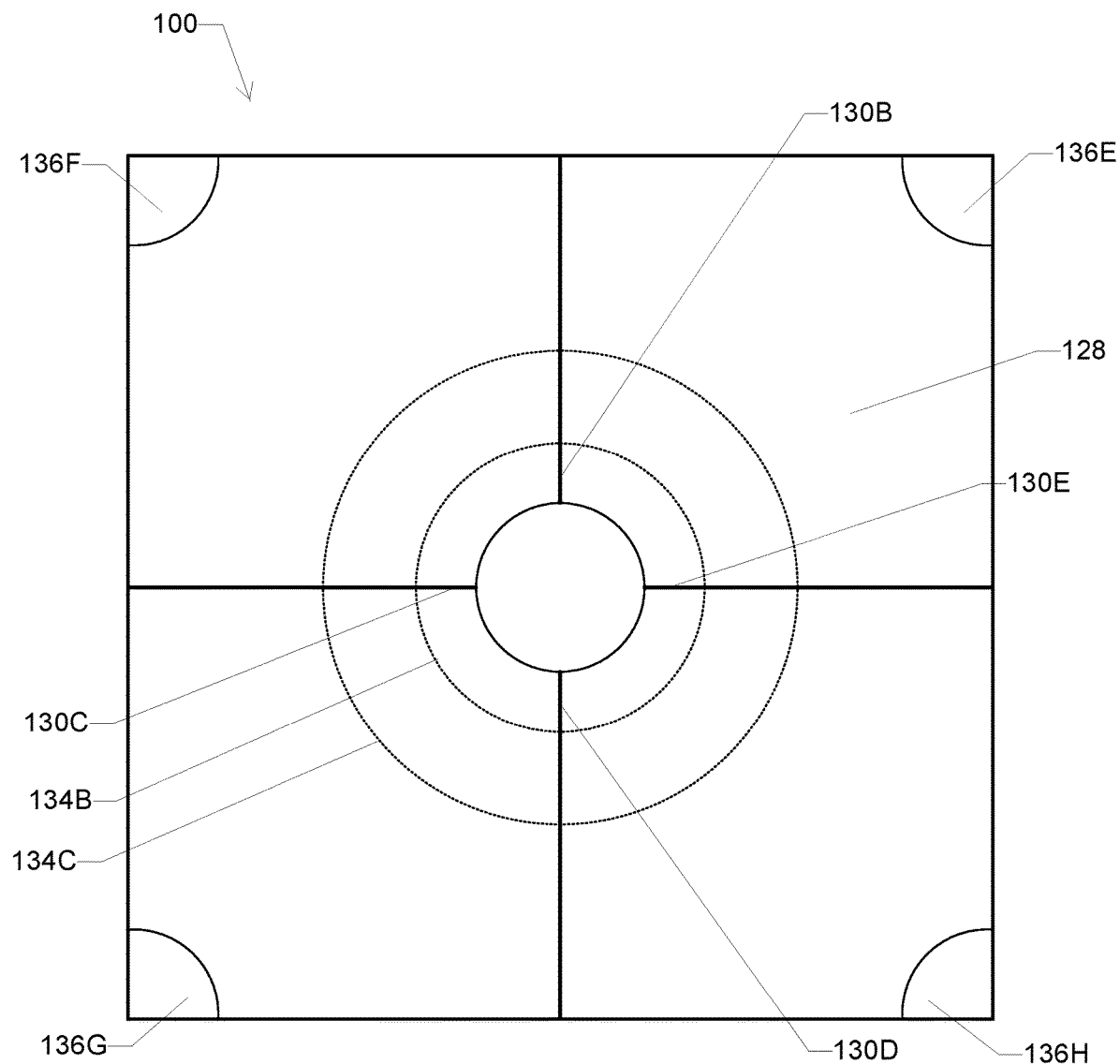
FIG. 6 is a schematic rear view of some embodiments of the liquid lens shown in FIG. 1 looking through a second outer layer of the liquid lens.

FIG. 5 is a schematic front view of liquid lens 100 looking through first outer layer 118, and FIG. 6 is a schematic rear view of the liquid lens looking through second outer layer 122. For clarity in FIGS. 5 and 6, and with some exceptions, bonds generally are shown in dashed lines, scribes generally are shown in heavier lines, and other features generally are shown in lighter lines.

In some embodiments, common electrode 124 is defined between scribe 130A and bond 134A, and a portion of the common electrode is uncovered by insulating layer 132 such that the common electrode can be in electrical communication with first liquid 106 as described herein. In some embodiments, bond 134A is configured such that electrical continuity is maintained between the portion of conductive layer 128 inside the bond (e.g., inside cavity 104) and the portion of the conductive layer outside the bond (e.g., outside the cavity). In some embodiments, liquid lens 100 comprises one or more cutouts 136 in first outer layer 118. For example, in the embodiments shown in FIG. 4, liquid lens 100 comprises a first cutout 136A, a second cutout 136B, a third cutout 136C, and a fourth cutout 136D. In some embodiments, cutouts 136 comprise portions of liquid lens 100 at which first outer layer 118 is removed to expose conductive layer 128. Thus, cutouts 136 can enable electrical connection to common electrode 124, and the regions of conductive layer 128 exposed at the cutouts can serve as contacts to enable electrical connection of liquid lens 100 to a controller, a driver, or another component of a lens or camera system.

Although cutouts 136 are described herein as being positioned at corners of liquid lens 100, other embodiments are included in this disclosure. For example, in some embodiments, one or more of the cutouts are disposed inboard of the outer perimeter of the liquid lens and/or along one or more edges of the liquid lens.

In some embodiments, driving electrode 126 comprises a plurality of driving electrode segments. For example, in the embodiments shown in FIGS. 5 and 6, driving electrode 126 comprises a first driving electrode segment 126A, a second driving electrode segment 126B, a third driving electrode segment 126C, and a fourth driving electrode segment 126D. In some embodiments, the driving electrode segments are distributed substantially uniformly about the sidewall of cavity 104. For example, each driving electrode segment occupies about one quarter, or one quadrant, of the sidewall of second portion 104B of cavity 104. In some embodiments, adjacent driving electrode segments are isolated from each other by a scribe. For example, first driving electrode segment 126A and second driving electrode segment 126B are isolated from each other by a scribe 130B. Additionally, or alternatively, second driving electrode segment 126B and third driving electrode segment 126C are isolated from each other by a scribe 130C. Additionally, or alternatively, third driving electrode segment 126C and fourth driving electrode segment 126D are isolated from each other by a scribe 130D. Additionally, or alternatively, fourth driving electrode segment 126D and first driving electrode segment 126A are isolated from each other by a scribe 130E. The various scribes 130 can be configured as described herein in reference to scribe 130A. In some embodiments, the scribes between the various electrode segments extend beyond cavity 104 and onto the back side of liquid lens 100 as shown in FIG. 6. Such a configuration can ensure electrical isolation of the adjacent driving electrode segments from each other. Additionally, or alternatively, such a configuration can enable each driving electrode segment to have a corresponding contact for electrical connection as described herein.

Although driving electrode 126 is described herein as being divided into four driving electrode segments, other embodiments are included in this disclosure. In some other embodiments, the driving electrode comprises a single driving electrode (e.g., substantially circumscribing the sidewall of the cavity). For example, the liquid lens comprising the such a single driving electrode can be capable of varying focal length, but incapable of tilting the interface (e.g., an autofocus only liquid lens). In some other embodiments, the driving electrode is divided into two, three, five, six, seven, eight, or more driving electrode segments (e.g., distributed substantially uniformly about the sidewall of the cavity).

In some embodiments, bond 134B and/or bond 134C are configured such that electrical continuity is maintained between the portion of conductive layer 128 inside the respective bond and the portion of the conductive layer outside the respective bond. In some embodiments, liquid lens 100 comprises one or more cutouts 136 in second outer layer 122. For example, in the embodiments shown in FIG. 6, liquid lens 100 comprises a fifth cutout 136E, a sixth cutout 136F, a seventh cutout 136G, and an eighth cutout 136H. In some embodiments, cutouts 136 comprise portions of liquid lens 100 at which second outer layer 122 is removed to expose conductive layer 128. Thus, cutouts 136 can enable electrical connection to driving electrode 126, and the regions of conductive layer 128 exposed at cutouts 136 can serve as contacts to enable electrical connection of liquid lens 100 to a controller, a driver, or another component of a lens or camera system.

Different driving voltages can be supplied to different driving electrode segments to tilt the interface of the liquid lens (e.g., for OIS functionality). Additionally, or alternatively, a driving voltage can be supplied to a single driving electrode or the same driving voltage can be supplied to each driving electrode segment to maintain the interface of the liquid lens in a substantially spherical orientation about the structural axis (e.g., for focus, zoom, and/or autofocus functionality).

In some embodiments, supplying a voltage signal to liquid lens 100 comprises supplying a potential between common electrode 124 and driving electrode 126 (e.g., to position and/or adjust interface 110). For example, supplying a brace voltage signal as described herein can comprise supplying a brace potential between common electrode 124 and driving electrode 126. Additionally, or alternatively, supplying a zero-voltage signal or a rest voltage signal as described herein can comprise supplying a zero potential between common electrode 124 and driving electrode 126. Additionally, or alternatively, supplying a driving voltage signal as described herein can comprise supplying a variable driving potential between common electrode 124 and driving electrode 126 to vary the focal length of liquid lens 100 (e.g., to perform focus, zoom, and/or autofocus functions) and/or to vary the tilt of the liquid lens (e.g., to perform an optical image stabilization function). In embodiments in which driving electrode 126 comprises the plurality of driving electrode segments as described herein, the potential between common electrode 124 and different driving electrode segments can be the same (e.g., for no or substantially no optical tilt) or different (e.g., for optical tilt).

In some embodiments, supplying the potential comprises supplying a common voltage signal to common electrode 124 and supplying a driving voltage signal to driving electrode 126. In some embodiments, the potential is a root mean square (RMS) potential between the common voltage signal and the driving voltage signal. In some embodiments, the common voltage signal and/or the driving voltage signal comprise alternating current (AC) signals. The AC signals can have sinusoidal, square wave, triangular wave, or another suitable wave configuration. The potential between common electrode 124 and driving electrode 126 can be adjusted using pulse width modulation (PWM), pulse amplitude modulation (PAM), or another suitable modulation technique. In some embodiments, a frequency of the AC signals (e.g., a switching frequency of the signals) can be sufficiently faster than a response time of liquid lens 100 that interface 110 is not substantially responsive to the switching of the signals, but rather to the potential between common electrode 124 and driving electrode 126. For example, the frequency of the AC signals can be 100 Hz, 500 Hz, 1000 Hz, 10,000 Hz, >10,000 Hz, or any ranges defined by the listed values. In some embodiments, the common voltage signal and/or the driving voltage signal can be direct current (DC) signals or another suitable electrical signal.

In some embodiments, the wettability of insulating layer 132 with respect to first liquid 106 depends at least in part on the voltage signal supplied to liquid lens 100. For example, increasing the potential between common electrode 124 and driving electrode 126 (e.g., increasing the voltage signal) can increase the wettability, and decreasing the potential between the common electrode and the driving electrode (e.g., decreasing the voltage signal) can decrease the wettability as described herein. In some embodiments, the position of interface 110 depends at least in part on the voltage signal supplied to liquid lens 100. For example, increasing the potential between common electrode 124 and driving electrode 126 (e.g., increasing the voltage signal) can move interface 110 farther toward the convex lens configuration (e.g., increase the optical power of the interface), and decreasing the potential between the common electrode and the driving electrode (e.g., decreasing the voltage signal) can move the interface farther toward the flat configuration and/or the concave lens configuration (e.g., decrease the optical power of the interface).

In some embodiments, interface 110 is adjustable between a rest position and a brace position. FIG. 2 shows some embodiments of liquid lens 100 with interface 110 in the rest position. In the rest position, a perimeter of interface 110 can be spaced from first window 114 by a rest distance $d_R$. For example, rest distance $d_R$ can be the minimum linear distance in an axial direction (e.g., parallel to structural axis 112) between the position of the perimeter of interface 110 in contact with an interior of cavity 104 (e.g., insulating layer 132) and an interior surface of window 114. In some embodiments, rest distance $d_R$ can be zero or approximately zero. For example, in the rest position, the perimeter of interface 110 can be positioned at a lip of cavity 104 (e.g., an edge of the bore in intermediate layer 120). In some of such embodiments, the interior surface of window 114 can be substantially aligned with the lip of cavity 104 in the lateral direction such that the perimeter of interface 110 is substantially aligned with the interior surface of the window in the lateral direction (e.g., rest distance $d_R$ can be zero). Additionally, or alternatively, in the rest position, interface 110 can comprise a rest surface area $A_R$. In some embodiments, the rest position comprises a position of the interface 110 achieved by supplying a zero-voltage signal to the liquid lens (e.g., by powering off the liquid lens). Additionally, or alternatively, in the rest position, interface 110 comprises a concave lens configuration (e.g., with negative optical power).

FIG. 3 shows some embodiments of liquid lens 100 with interface 110 in the brace position. In the brace position, the perimeter of interface 110 can be spaced from first window 114 by a brace distance $d_B$. For example, brace distance $d_B$ can be the minimum linear distance in the axial direction between the position of the perimeter of interface 110 in contact with the interior of cavity 104 and the interior surface of window 114. Additionally, or alternatively, in the brace position, interface 110 can comprise a brace surface area $A_B$. In some embodiments, the brace position comprises a position of the interface 110 achieved by supplying a brace voltage signal to the liquid lens. Additionally, or alternatively, in the brace position, interface 110 comprises a substantially flat or planar configuration (e.g., with zero optical power).

As shown in FIGS. 2-3, brace distance $d_B$ can be greater than rest distance $d_R$. For example, moving interface 110 from the rest position to the brace position can increase the distance between the perimeter of the interface and the interior surface of first window 114 (e.g., by moving the perimeter of the interface away from the first window). Subjecting liquid lens 100 to a shock event can cause droplets of second liquid 108 to separate from the bulk of the second liquid and move into first liquid 106. For example, subjecting liquid lens 100 to a shock event can cause some degree of emulsification of second liquid 108 into first liquid 106. Moving interface 110 from the rest position to the brace position can reduce the likelihood of droplets of second liquid 108 accumulating on first window 114 and/or within recess 119 (e.g., upon subjecting liquid lens 100 to a shock event) as described herein. For example, increasing the distance between second liquid 108 and first window 114 can reduce the likelihood of droplets of the second liquid contacting the first window and/or moving into recess 119. Additionally, or alternatively, moving interface 110 from the rest position to the brace position can reduce the likelihood of second liquid 108 contacting an edge of first window 114 (e.g., upon subjecting liquid lens 100 to a shock event) as described herein. For example, increasing the distance between second liquid 108 and first window 114 can reduce the likelihood of the second liquid contacting an edge of the first window along an inner perimeter of recess 119, which can reduce the likelihood of the edge breaking or otherwise disrupting the interface. Additionally, or alternatively, moving interface 110 from the rest position to the brace position can increase the distance between the perimeter of the interface and the lip of cavity 104, which can reduce the likelihood of the lip breaking or otherwise disrupting the interface (e.g., upon subjecting liquid lens 100 to a shock event). Additionally, or alternatively, moving interface 110 from the rest position to the brace position can decrease the surface area of the interface, which can increase the surface tension of second liquid 108 at the interface and/or decrease the surface energy of the second liquid at the interface, which can reduce the likelihood of droplets of the second liquid separating from the bulk of the second liquid (e.g., upon subjecting liquid lens 100 to a shock event) as described herein. For example, decreasing the surface area of interface 110, which can increase the surface tension of second liquid 108 at the interface and/or decrease the surface energy of the second liquid at the interface, can increase the energy barrier for droplets of the second liquid to separate from the bulk of the second liquid, thereby reducing the likelihood of emulsification.

Although the brace position is described in reference to FIG. 3 as a static position, other embodiments are included in this disclosure. In some embodiments, the brace position is a dynamic position. For example, the brace voltage signal can be a dynamic voltage signal that causes interface 110 to move (e.g., such that the perimeter of the interface moves away from first window 114, moves periodically about a particular configuration such as the flat or planar configuration, etc.). In some of such embodiments, the brace position can be a dynamic position in which the perimeter of interface 110 is in motion during some or all of a period from detecting a brace trigger event to detecting a brace release event as described herein. In some of such embodiments, momentum of interface 110 during such motion can further protect liquid lens 100 (e.g., from emulsification) as described herein.

Figure 7:
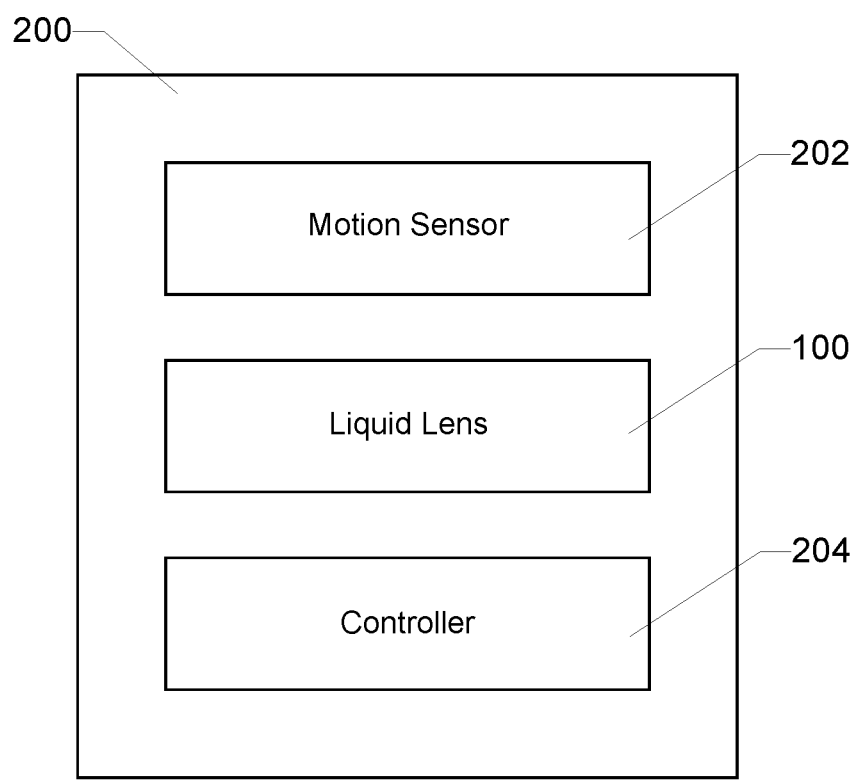
FIG. 7 is a schematic block diagram of some embodiments of a liquid lens system.

FIG. 7 is a schematic block diagram of some embodiments of a liquid lens system 200. In some embodiments, liquid lens system 200 comprises liquid lens 100 as described herein. In some embodiments, liquid lens system 200 comprises a motion sensor 202. Motion sensor 202 can detect position, velocity, acceleration, rotation, and/or orientation of liquid lens system 200 and/or another system or device comprising the liquid lens system. For example, motion sensor 202 comprises a gyroscope, an accelerometer, a magnetometer, another suitable sensing device, or a combination thereof. Motion sensor 202 can be used to detect a potential pending impact and/or an impact event as described herein. In some embodiments, liquid lens system 200 comprises a controller 204. Controller 204 can be configured to send and/or receive signals from other components of liquid lens system 200 and/or another system or device comprising the liquid lens system as described herein. Additionally, or alternatively, controller 204 can be configured to determine a voltage signal to supply to liquid lens 100 and/or to supply the voltage signal to the liquid lens as described herein.

Figure 8:
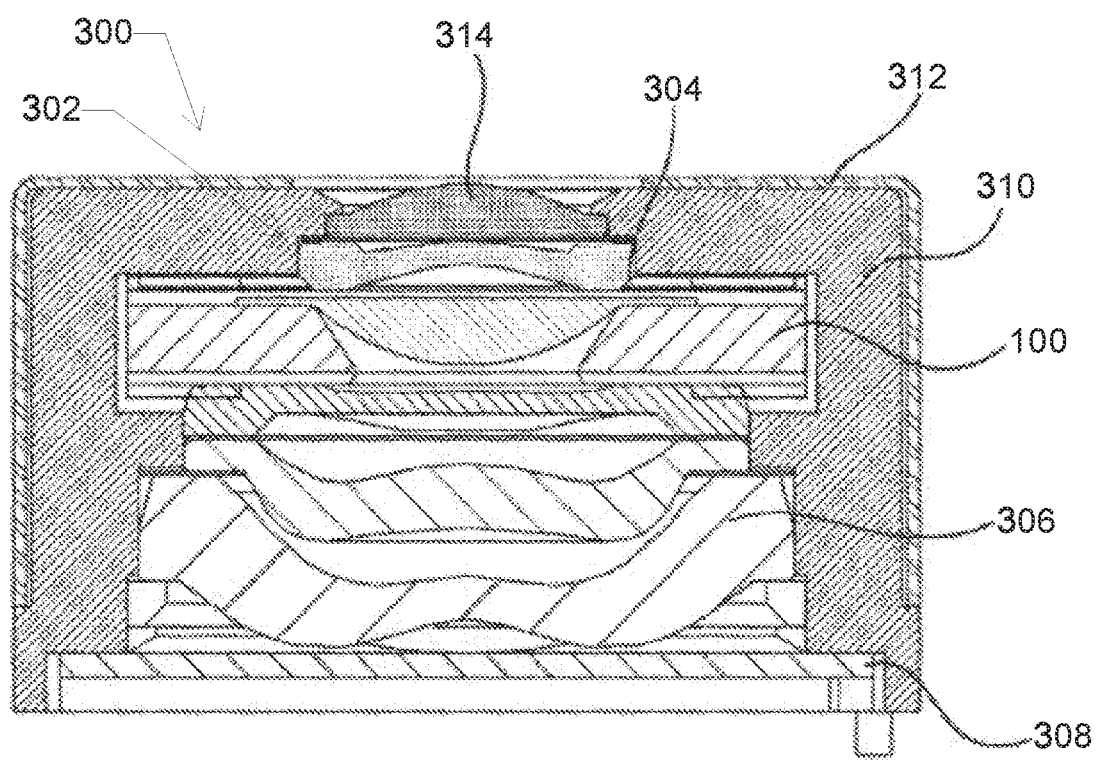
FIG. 8 is a schematic cross-sectional view of some embodiments of a camera module.

FIG. 8 is a schematic cross-sectional view of some embodiments of a camera module 300. In some embodiments, camera module 300 comprises a lens assembly 302. For example, lens assembly 302 comprises a first lens group 304, liquid lens 100, and a second lens group 306 aligned along an optical axis. For example, structural axis 112 of liquid lens 100 can be aligned with the optical axis of camera module 300. Each of first lens group 304 and second lens group 306 can comprise, independently, one or a plurality of lenses (e.g., fixed lenses).

Although lens assembly 302 is described herein as comprising liquid lens 100 disposed between first lens group 304 and second lens group 306, other embodiments are included in this disclosure. In some other embodiments, a lens assembly comprises a single lens or a single lens group disposed on either side (e.g., the object side or the image side) of liquid lens 100 along the optical axis.

In some embodiments, camera module 300 comprises an image sensor 308. For example, lens assembly 302 is positioned to focus an image on image sensor 308. Image sensor 308 can comprise a semiconductor charge-coupled device (CCD), a complementary metal-oxide-semiconductor (CMOS), an N-type metal-oxide-semiconductor (NMOS), another image sensing device, or a combination thereof. Image sensor 308 can detect image light focused on the image sensor by lens assembly 302 to capture the image represented by the image light.

In some embodiments, camera module 300 comprises a housing 310. For example, lens assembly 302 and/or image sensor 308 are mounted in housing 310 as shown in FIG. 8. Such a configuration can help to maintain proper alignment between lens assembly 302 and image sensor 308. In some embodiments, camera module 300 comprises a cover 312. For example, cover 312 is positioned on housing 310. Cover 312 can help to protect and/or shield lens assembly 302, image sensor 308, and/or housing 310. In some embodiments, camera module 300 comprises a lens cover 314 disposed adjacent lens assembly 302 (e.g., at the object side end of the lens assembly). Lens cover 314 can help to protect lens assembly 302 (e.g., first lens group 304) from scratches or other damage.

Figure 9:
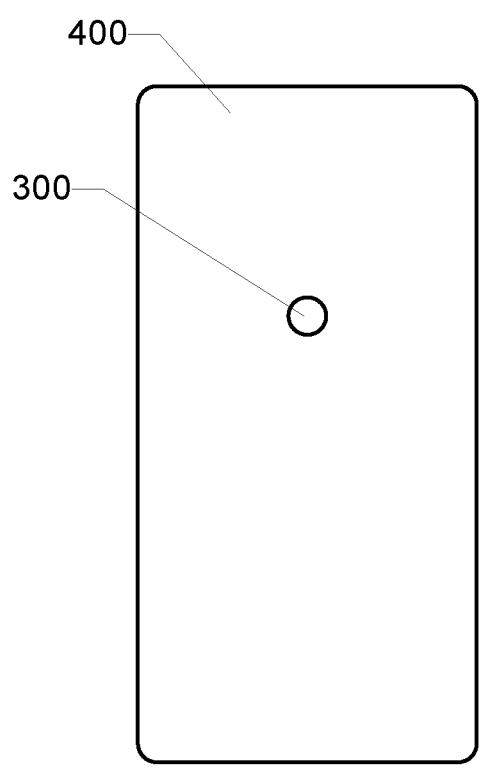
FIG. 9 is a schematic rear view of some embodiments of a smartphone comprising a camera module.

In some embodiments, a device comprises liquid lens system 200 and/or camera module 300. For example, the device can be a smartphone, a tablet computer, a laptop computer, a wearable device, an augmented reality (AR) device, a virtual reality (VR) device, a digital camera, a video chat device, an action camera device, or another suitable electronic device. FIG. 9 is a schematic rear view of some embodiments of a smartphone 400 comprising camera module 300. Smartphone 400 can be operable to capture still images (e.g., photographs) and/or record video using camera module 300.

Although camera module 300 is described as being incorporated into an electronic device, other embodiments are included in this disclosure. For example, in other embodiments, a vehicle (e.g., an automobile, a truck, a motorcycle, an aircraft, a bus, a train, a watercraft, a drone, or another type of conveyance for people or objects) comprises camera module 300.

Although motion sensor 202 and controller 204 are shown and described in reference to FIG. 7 as being incorporated into liquid lens system 200, other embodiments are included in this disclosure. In some embodiments, motion sensor 202 and/or controller 204 can be components of a camera module (e.g., camera module 300), an electronic device (e.g., smartphone 400), or another system (e.g., a vehicle). For example, smartphone 400 can comprise a motion sensor that can be used to perform some or all of the functions described herein with respect to motion sensor 202. Additionally, or alternatively, smartphone 400 can comprise a controller that can be used to perform some or all of the functions described herein with respect to controller 204. Using components of a larger system (e.g., an electronic device or a vehicle) to perform functions in connection with liquid lens system 200 and/or camera module 300 can enable more efficient use of system resources. For example, the component of the larger system can be used to perform functions for a variety of subsystems without incorporating redundant components.

In some embodiments, using components of the larger system (e.g., an electronic device or a vehicle) to perform functions in connection with liquid lens system 200 and/or camera module 300 can enable manipulation of the liquid lens system even though the camera module and/or the liquid lens system may be deactivated. For example, incorporating motion sensor 202 and/or controller 204 (or the functions thereof) into the larger system can enable monitoring motion, determining voltage signals, and/or activating camera module 300, liquid lens system 200, and/or liquid lens 100 while the camera module, the liquid lens system, and/or the liquid lens are powered off.

Figure 10:
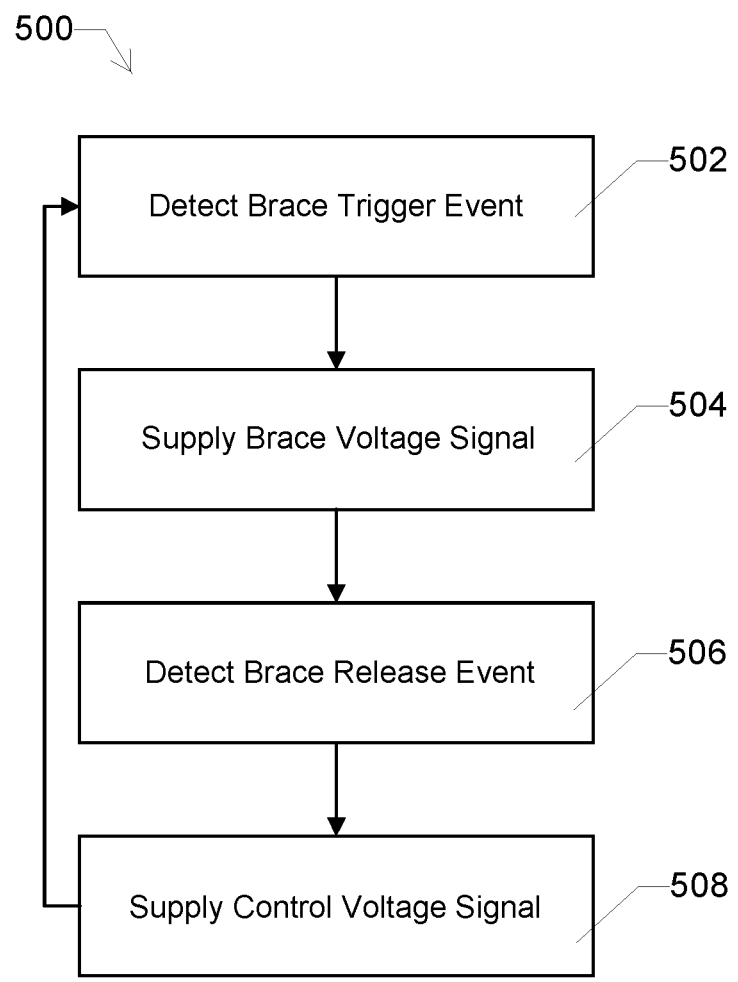
FIG. 10 is a block diagram illustrating some embodiments of a method of operating a liquid lens.

FIG. 10 shows a block diagram illustrating some embodiments of a method 500 of operating a liquid lens, such as liquid lens 100. In some embodiments, method 500 comprises detecting a brace trigger event at step 502. The brace trigger event can be an event signaling that it may be desirable to position interface 110 in the brace position (e.g., to position the interface away from first window 114 and/or to reduce the surface area of the interface as described herein). For example, the brace trigger event can comprise a potential impending impact, a camera shutdown, a display activation, a device activation, another suitable event, or a combination thereof.

In some embodiments, the brace trigger event comprises the potential impending impact. In some of such embodiments, detecting the brace trigger event comprises detecting the potential pending impact using a motion sensor, such as motion sensor 202. For example, motion sensor 202 can be used to detect a freefall event (e.g., when a device is dropped) that may indicate an increased likelihood of an impending impact (e.g., the dropped device hitting the ground). Additionally, or alternatively, motion sensor 202 can be used to detect a tumbling event (e.g., when a device is rotating about one or more axes) that may indicate an increased likelihood of an impending impact (e.g., the dropped device hitting the ground or striking another object). Positioning interface 110 in the brace position as described herein can reduce the likelihood of emulsification of second liquid 108 into first liquid 106 in the event that the impending impact actually occurs.

In some embodiments, the brace trigger event comprises the camera shutdown. In some of such embodiments, the camera shutdown comprises powering off a camera module (e.g., camera module 300), a liquid lens system (e.g., liquid lens system 200), and/or a liquid lens (e.g., liquid lens 100). For example, the camera shutdown can be in response to deactivating a camera application (e.g., closing a camera app on a smartphone, deactivating an imaging application in a vehicle, etc.). Positioning interface 110 in the brace position as described herein can reduce the likelihood of emulsification of second liquid 108 into first liquid 106 in the event of an impact event while the camera is deactivated. In some embodiments, interface 110 can be positioned in the brace position when liquid lens 100 is not being operated (e.g., when the liquid lens is not being adjusted to perform focus, zoom, autofocus and/or optical image stabilization functions), such as while the camera is deactivated. For example, the brace position can be the default position for interface 110 as opposed to the rest position (e.g., by supplying the brace voltage signal to the liquid lens as opposed to the zero-voltage signal while the camera is deactivated and applying a control voltage signal to the liquid lens when it is desirable to perform focus, zoom, autofocus and/or optical image stabilization functions as described herein). Additionally, or alternatively, maintaining interface 110 in the brace position (e.g., by supplying the brace voltage to liquid lens 100) while the camera is deactivated can help to protect the liquid lens without continuing to monitor for other brace trigger events (e.g., while motion sensor 202, controller 204, and/or other components of liquid lens system 200 and/or camera module 300 are deactivated). Additionally, or alternatively, because liquid lens 100 can function as a voltage driven device as opposed to a current driven device, the power consumed by supplying the brace voltage to the liquid lens while the camera is deactivated can be negligible.

In some embodiments, the brace trigger event comprises the display activation. In some of such embodiments, the display activation comprises powering on a display of a device (e.g., smartphone 400). For example, the display activation can be in response to a change in orientation (e.g., detected by a motion sensor) resulting from a user picking up smartphone 400 and/or positioning the smartphone for use, which can increase the likelihood of dropping the smartphone. Positioning interface 110 in the brace position as described herein can reduce the likelihood of emulsification of second liquid 108 into first liquid 106 in the event of an impact event while the display is activated. Additionally, or alternatively, maintaining interface 110 in the brace position (e.g., by supplying the brace voltage to liquid lens 100) while the display is activated can help to protect the liquid lens without continuing to monitor for other brace trigger events (e.g., while motion sensor 202, controller 204, and/or other components of liquid lens system 200 and/or camera module 300 are deactivated). Additionally, or alternatively, because liquid lens 100 can function as a voltage driven device as opposed to a current driven device, the power consumed by supplying the brace voltage to the liquid lens while the camera is deactivated can be negligible.

In some embodiments, the brace trigger event comprises the device activation. In some of such embodiments, the device activation comprises powering on a device (e.g., smartphone 400), which can increase the likelihood of dropping the device. Positioning interface 110 in the brace position as described herein can reduce the likelihood of emulsification of second liquid 108 into first liquid 106 in the event of an impact event while the device is activated. For example, the brace position can be the default position for interface 110 as opposed to the rest position (e.g., by supplying the brace voltage signal to the liquid lens as opposed to the zero-voltage signal while the device is activated and applying a control voltage signal to the liquid lens when it is desirable to perform focus, zoom, autofocus and/or optical image stabilization functions as described herein). Additionally, or alternatively, maintaining interface 110 in the brace position (e.g., by supplying the brace voltage to liquid lens 100) while the device is activated can help to protect the liquid lens without continuing to monitor for other brace trigger events (e.g., while motion sensor 202, controller 204, and/or other components of liquid lens system 200 and/or camera module 300 are deactivated). Additionally, or alternatively, because liquid lens 100 can function as a voltage driven device as opposed to a current driven device, the power consumed by supplying the brace voltage to the liquid lens while the camera is deactivated can be negligible.

In some embodiments, method 500 comprises supplying a brace voltage signal to liquid lens 100 at step 504. For example, method 500 comprises supplying the brace voltage signal in response to the brace trigger event. Supplying the brace voltage signal can position interface 110 in the brace position. For example, supplying the brace voltage signal can move interface 110 from the rest position, a driving position (e.g., for achieving a desired focus and/or tilt), or another position to the brace position. Positioning interface 110 in the brace position (e.g., in response to the brace trigger event) can reduce the likelihood of emulsification of second liquid 108 into first liquid 106 as described herein.

In some embodiments, method 500 comprises detecting the brace trigger event at step 502 and supplying the brace voltage signal to liquid lens 100 at step 504 to position variable interface 110 in the brace position in response to the detecting the brace trigger event. In some embodiments, method 500 comprises receiving a brace signal indicative of the brace trigger event (e.g., from a motion sensor and/or controller positioned outside liquid lens 100, liquid lens system 200, and/or camera module 300) and supplying the brace voltage signal to the liquid lens to position variable interface 100 in the brace position in response to the receiving the brace signal.

In some embodiments, method 500 comprises detecting a brace release event at step 506. The brace release event can be an event signaling that it may be desirable to position interface 110 in a position other than the brace position (e.g., a rest position, a driving position, or another position). For example, the brace release event can comprise an impact, a termination of potential impending impact, a camera activation, or a combination thereof. In some embodiments, method 500 comprises continuing to supply the brace voltage to liquid lens 100 until the brace release event. For example, method 500 comprises maintaining interface 110 in the brace position (e.g., by supplying the brace voltage to liquid lens 100) during the period from the brace trigger event until the brace release event.

In some embodiments, method 500 comprises supplying a control voltage signal to liquid lens 100 at step 508. For example, method 500 comprises supplying the control voltage signal in response to the brace release event. Supplying the control voltage signal can position interface 110 in a driving position. For example, the control voltage signal can comprise a variable signal, and supplying the driving voltage signal to liquid lens 100 can vary the driving signal to adjust interface 110 to perform a focus, a zoom, an autofocus, and/or an optical image stabilization function. In some embodiments, supplying the control voltage signal comprises operating liquid lens 100 to perform focus, zoom, autofocus and/or optical image stabilization functions.

In some embodiments, the brace release event comprises the impact. In some of such embodiments, detecting the brace release event comprises detecting the impact using a motion sensor, such as motion sensor 202. For example, motion sensor 202 can be used to detect a sudden shock and/or deceleration (e.g., when a device hits the ground) that may indicate an impending impact actually occurred. Supplying the control voltage as described herein can enable operation of liquid lens 100 after determining that the likelihood of emulsification of second liquid 108 into first liquid 106 has been reduced. For example, supplying the control voltage can enable use of liquid lens 100, liquid lens system 200, and/or camera module 300 to function for capturing images and/or video.

In some embodiments, the brace release event comprises the termination of potential impending impact. In some of such embodiments, detecting the brace release event comprises detecting the termination of potential impending impact using a motion sensor, such as motion sensor 202. For example, motion sensor 202 can be used to detect an arrest of a freefall event (e.g., when a dropped device is caught) that may indicate an impending impact is no longer likely to occur. Supplying the control voltage as described herein can enable operation of liquid lens 100 after determining that the likelihood of emulsification of second liquid 108 into first liquid 106 has been reduced. For example, supplying the control voltage can enable use of liquid lens 100, liquid lens system 200, and/or camera module 300 to function for capturing images and/or video.

In some embodiments, the brace release event comprises the camera activation. In some of such embodiments, the camera activation comprises powering on a camera module (e.g., camera module 300), a liquid lens system (e.g., liquid lens system 200), and/or a liquid lens (e.g., liquid lens 100). For example, the camera activation can be in response to activating a camera application (e.g., opening a camera app on a smartphone, activating an imaging application in a vehicle, etc.). Supplying the control voltage as described herein can enable operation of liquid lens 100 after determining that the likelihood of emulsification of second liquid 108 into first liquid 106 has been reduced. For example, supplying the control voltage can enable use of liquid lens 100, liquid lens system 200, and/or camera module 300 to function for capturing images and/or video.

In some embodiments, method 500 comprises detecting the brace release event at step 506 and supplying the control voltage signal to liquid lens 100 at step 508 in response to the detecting the brace release event. In some embodiments, method 500 comprises receiving a brace release signal indicative of the brace release event (e.g., from a motion sensor and/or controller positioned outside liquid lens 100, liquid lens system 200, and/or camera module 300) and supplying the control voltage signal to the liquid lens in response to the receiving the brace signal.

Figure 11:
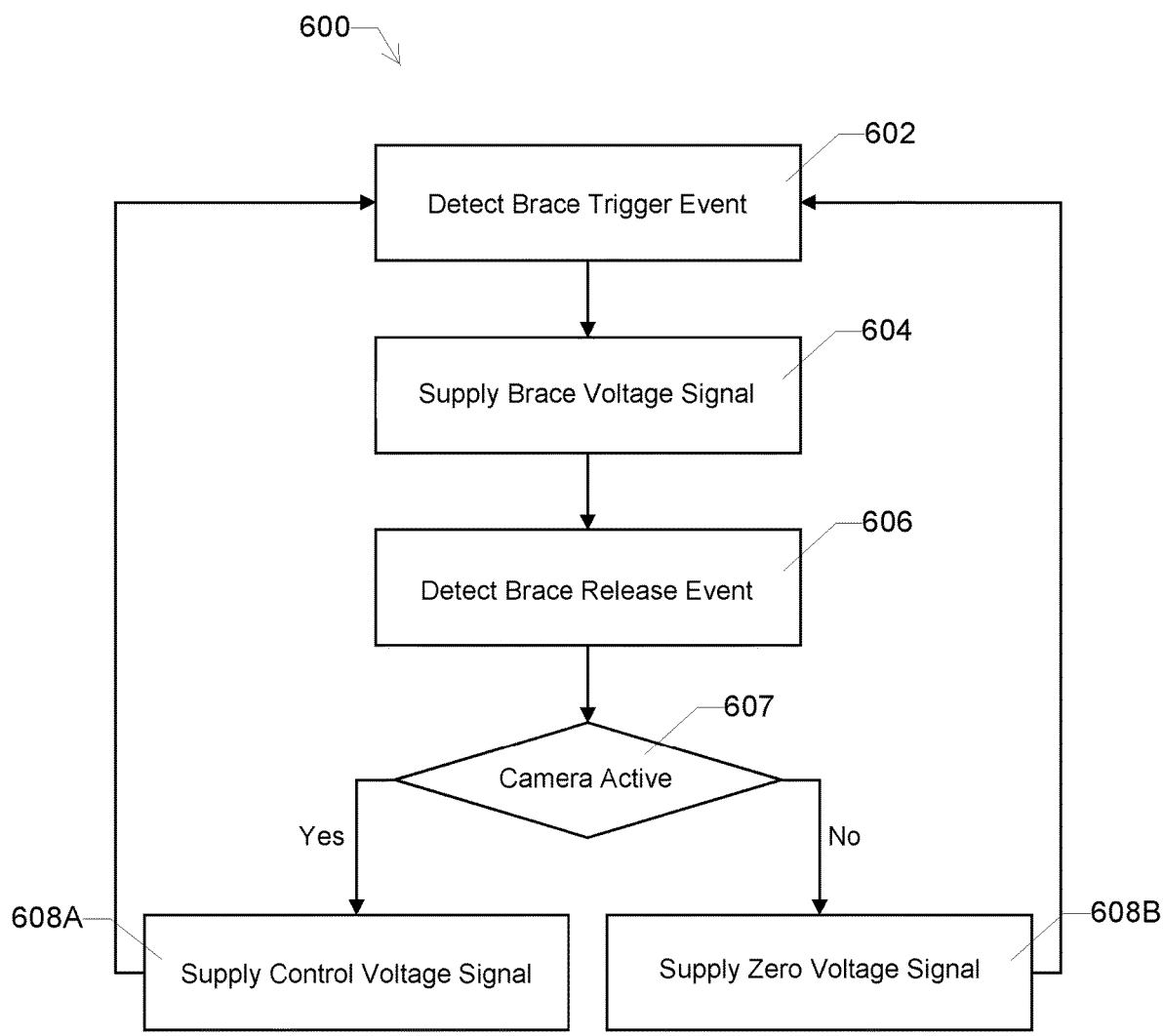
FIG. 11 is a block diagram illustrating some embodiments of a method of operating a liquid lens.

FIG. 11 shows a block diagram illustrating some embodiments of a method 600 of operating a liquid lens, such as liquid lens 100. Method 600 can be similar to method 500. For example, method 600 can comprise detecting a brace trigger event at step 602, supplying a brace voltage signal to liquid lens 100 at step 604, and/or detecting a brace release event at step 606.

In some embodiments, method 600 comprises determining whether a camera is active at step 607. For example, determining whether the camera is active comprises determining whether a camera module (e.g., camera module 300), a liquid lens system (e.g., liquid lens system 200), and/or a liquid lens (e.g., liquid lens 100) are powered on. Additionally, or alternatively, determining whether the camera is active comprises determining whether a camera application (e.g., a camera app on a smartphone, an imaging application in a vehicle, etc.) is open and/or activated.

In some embodiments, method 600 comprises supplying one of a control voltage signal or a zero-voltage signal to the liquid lens in response to the brace release event. In some of such embodiments, method 600 comprises supplying the control voltage signal if the camera is active. For example, method 600 comprises supplying the control voltage signal to position interface 110 in the control position (e.g., to adjust interface 110 to perform focus, zoom, autofocus and/or optical image stabilization functions) if the camera is active. Additionally, or alternatively, method 600 comprises supplying the zero-voltage signal if the camera is inactive. For example, method 600 comprises supplying the zero-voltage signal to position interface 110 in the rest position (e.g., to power down liquid lens 100) if the camera is inactive.

In some embodiments, the methods, techniques, microprocessors, and/or controllers described herein can be implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The processor(s) and/or controller(s) described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

The processor(s) and/or controller(s) described herein may implement the techniques described herein using customized hard-wired logic, one or more ASICs or FPGAs, firmware and/or program logic which causes microprocessors and/or controllers to be a special-purpose machine. In some embodiments, parts of the techniques disclosed herein are performed by a processor (e.g., a microprocessor) and/or other controller elements in response to executing one or more sequences instructions contained in a memory. Such instructions may be read into the memory from another storage medium, such as a storage device. Execution of the sequences of instructions contained in the memory may cause the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. In some embodiments, a processor device can include electrical circuitry configured to process computer-executable instructions. Additionally, or alternatively, a processor device can include an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

It will be apparent to those skilled in the art that various modifications and variations can be made without departing from the spirit or scope of the claimed subject matter. Accordingly, the claimed subject matter is not to be restricted except in light of the attached claims and their equivalents.

What is claimed is:

1. A method of operating a liquid lens, the method comprising:
   positioning a variable interface between a first liquid and a second liquid in a brace position in response to a brace trigger event;
   wherein the variable interface is adjustable between (a) a rest position in which a perimeter of the variable interface is spaced from a first window of the liquid lens by a rest distance and (b) the brace position in which the perimeter of the variable interface is spaced from the first window of the liquid lens by a brace distance;
   wherein the brace distance is greater than the rest distances;
   wherein the positioning of the variable interface in the brace position comprises supplying a brace potential between a common electrode of the liquid lens and at least one driving electrode of the liquid lens; wherein the supplying the brace potential comprises supplying a common voltage signal to the common electrode and supplying a driving voltage signal to the at least one driving electrode; and
   the brace potential comprises a root mean square (RMS) potential between the common voltage signal and the driving voltage signal.

2. The method of claim 1, wherein:
   in the rest position, the variable interface comprises a rest surface area;
   in the brace position, the variable interface comprises a brace surface area; and
   the brace surface area is less than the rest surface area.

3. The method of claim 1, wherein the brace trigger event comprises a potential impending impact.

4. The method of claim 1, wherein the brace trigger event comprises a camera shutdown.

5. The method of claim 1, wherein the brace trigger event comprises a display activation.

6. The method of claim 1, wherein the brace trigger event comprises a device activation.

7. The method of claim 1, wherein the rest position comprises a position of the variable interface achieved by supplying a zero-voltage signal to the liquid lens.

8. The method of claim 1, wherein, in the rest position, the variable interface comprises a concave lens configuration.

9. The method of claim 1, wherein, in the brace position, the variable interface comprises a substantially flat configuration.

10. The method of claim 1, comprising:
    detecting the brace trigger event; and
    supplying a brace voltage signal to the liquid lens to position the variable interface in the brace position in response to the detecting the brace trigger event.

11. The method of claim 1, comprising:
    receiving a brace signal indicative of the brace trigger event; and
    supplying the brace voltage signal to the liquid lens to position the variable interface in the brace position in response to the receiving the brace signal.

12. The method of claim 1, comprising maintaining the variable interface in the brace position until a brace release event.

13. The method of claim 12, comprising supplying one of a control voltage signal or a zero-voltage signal to the liquid lens in response to the brace release event.

14. The method of claim 13, wherein the control voltage signal adjusts the variable interface for at least one of a focus function or an optical image stabilization function.

15. The method of claim 13, wherein the supplying one of the control voltage signal or the zero voltage signal comprises:
    supplying the control voltage signal if a camera is active; and
    supplying the zero-voltage signal if the camera is inactive.

16. The method of claim 12, wherein the brace release event comprises at least one of an impact or a termination of potential impending impact.

17. The method of claim 12, wherein the brace release event comprises a camera activation.

18. The method of claim 1, wherein the second liquid comprises a lower surface energy and a higher surface tension with the variable interface in the brace position than in the rest position.

\* \* \* \* \*

UNITED STATES PATENT AND TRADEMARK OFFICE
CERTIFICATE OF CORRECTION

| | |
|---|---|
| PATENT NO. | : 11,675,182 B2 |
| APPLICATION NO. | : 17/091859 |
| DATED | : June 13, 2023 |
| INVENTOR(S) | : Paul Ewing Langenbacher et al. |

It is certified that error appears in the above-identified patent and that said Letters Patent is hereby corrected as shown below:

On the Title Page

Item (72), in Column 1, in "Inventors", Line 3, delete "R C" and insert -- RC --.

In the Claims

In Column 19, Lines 66-67, in Claim 1, delete "distances;" and insert -- distance; --.

Signed and Sealed this
Twelfth Day of December, 2023

Katherine Kelly Vidal
*Director of the United States Patent and Trademark Office*